May 30, 1961 K. W. KAMPERT ET AL 2,986,292
BUCKET OPERATING MEANS FOR TRACTOR LOADERS
Filed Feb. 5, 1960 2 Sheets-Sheet 1

INVENTORS
Keith W. Kampert
Richard F. Zimmerman
Paul O. Pippel
ATTORNEY

May 30, 1961 K. W. KAMPERT ET AL 2,986,292
BUCKET OPERATING MEANS FOR TRACTOR LOADERS
Filed Feb. 5, 1960 2 Sheets-Sheet 2

INVENTORS
KEITH W. KAMPERT
RICHARD F. ZIMMERMAN

Paul O. Pippel
ATTORNEY

United States Patent Office 2,986,292
Patented May 30, 1961

2,986,292

BUCKET OPERATING MEANS FOR TRACTOR LOADERS

Keith W. Kampert, Libertyville, and Richard F. Zimmerman, Waukegan, Ill., assignors to The Frank G. Hough Co., a corporation of Illinois Filed Feb. 5, 1960, Ser. No. 6,919

5 Claims. (Cl. 214—140)

This invention relates generally to tractor loaders, and more specifically to an improved construction for the bucket tilting or pivoting means of a front end type tractor loader.

Front end type tractor loaders generally comprise a tractor having an earth working tool or bucket operatively carried from the forward end of the tractor by boom and linkage means interconnected between the bucket and the tractor. The boom provides the main support for the bucket and may be raised or lowered as desired by the operator of the machine for raising and lowering the bucket in its various digging, carrying and dumping operations. The linkage means supports the bucket in different pivotal positions relative to the boom. In digging, the bottom wall of the bucket is generally positioned by the linkage means in a substantially horizontal position so that the tractor may be moved forwardly to force the cutting edge of the bucket which is carried on the forward marginal edge of the bottom wall thereof into the material to be dug. In completely loading the bucket and in carrying a loaded bucket, the linkage means is operated to pivot the bottom wall of the bucket upwardly to keep and retain a relatively large amount of material within the confines of the bucket. In dumping, the linkage means is operated to pivot the bottom wall of the bucket downwardly so that the material may fall therefrom under the influence of gravity.

As tractor loaders become commercially larger and larger in size, problems of strengthening the various members to enable them to safely withstand the loading force resulting from the relatively large sizes of the machines are increased, and such loaders as presently known in the art are subject to considerable twisting and deformation of the various members. This twisting or deformation may more easily occur in the linkage means because of the relative lighter construction of the linkage means relative to the boom members.

It is the object of the present invention to provide a leverage arrangement for the linkage means of a front end type tractor which by its construction is capable of withstanding extremely large forces.

It is a further object of the present invention to provide in a front end type tractor loader, a linkage means for pivoting the bucket thereof wherein a single hydraulic ram or cylinder is used to pivot the bucket relative to the boom thereof.

It is a further object of the present invention to provide a certain lever arrangement in the linkage means of a front end type of tractor loader wherein the bucket is carried upon transversely spaced boom pivot pins and wherein the lever arrangement will efficiently maintain the bucket in various adjusted positions relative to the boom under conditions of relatively high loading.

It is further an object of the present invention to provide in a device of the character just described, a leverage arrangement such that under conditions of unbalanced loading on the sides of the bucket, the bucket may be pivoted relative to the boom by a single hydraulic ram or cylinder with a minimum of distortion of the various members.

Other objects and features of the present invention will be apparent upon perusal of the following specification and drawings of which:

The present embodiment is the preferred embodiment but it is to be understood that changes can be made in the present embodiment by one skilled in the art without departing from the spirit and scope of the present invention.

For a general description of the present invention reference is made to the drawings. The invention comprises a leverage arrangement which is carried between the arms of the boom upon a shaft which extends between the boom arms. The shaft is journalled through a relatively heavy cylindrical member. A pair of levers are secured at each end of the cylindrical member and extend radially therefrom in the same direction. A third or center lever is secured to the cylindrical member between the pair of levers and extends radially therefrom in a direction substantially opposite from the direction in which the pair of levers extend. The outer end of each of the pair of levers is pivotally connected to a link, and the other end of each of the links is pivotally connected to the rearward wall of the bucket through suitable flanges secured thereon. The outer end of the center lever of the leverage arrangement is pivotally connected to one end of a double acting hydraulic ram or cylinder, and the other end of that hydraulic cylinder is pivotally connected to the tractor. The leverage arrangement of the cylindrical member, the center lever and the pair of levers is so constructed that substantially no deflection of one lever relative to another can occur in the use of the described arrangement. When the linkage ram is hydraulically locked, and the bucket is forced into a material to be worked, any forces tending to pivot the bucket about its pivotal axis on the boom are applied through the links to the pair of levers of the lever arrangement. From the pair of levers, the forces are directed through the cylindrical member, through the center lever, and from the center lever through the linkage hydraulic ram to the tractor. The shaft upon which the leverage arrangement is pivotally carried serves no function of reinforcing the boom arms and therefore the boom arms are essentially independent of each other, and except for the leverage arrangement rotating or twisting forces on the bucket would be transferred to the boom arms to cause relative deflections thereof.

For a detailed description of the present invention continued reference is made to the drawings. The tractor comprises a frame 10 carried upon wheels 11, in turn supporting an engine compartment 12 at the rearward end thereof, an operator's compartment 13 substantially in the center thereof and a somewhat open platform portion at the forward end thereof for the carrying of the loader arrangement.

Figure 4:
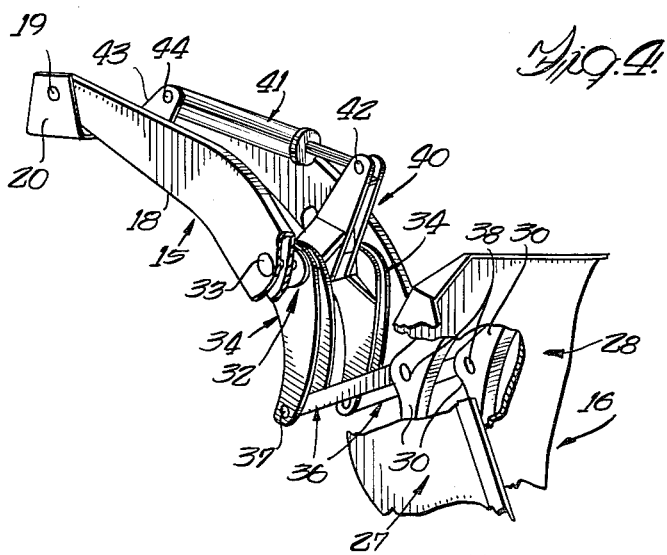
Fig. 4 is a view similar to Fig. 3 but with the bucket and portions of the boom removed to further show the leverage construction of the linkage means.

The loader arrangement comprises a boom 15, a bucket 16 and a linkage means including a leverage arrangement 17. The boom 15 comprises a pair of boom arms 18 which may be constructed in a somewhat box frame section such as shown in Fig. 4. One end of each boom arm 18 is pivotally carried on the tractor by pins 19 at a position immediately forwardly of the operator's compartment 13 and below the operator's horizontal line of vision. The pins 19 are carried in a bracket arrangement 20 which in turn is supported on the forward portion of the frame 10 of the tractor. The other end of each of the boom arms 18 extends forwardly of the tractor over the front axle for the wheels 11 and between the wheels 11 and the side of the tractor. The boom arms 18 are raised and lowered by a pair of hydraulic rams 21, one ram 21 being provided for each boom arm 18 on each side of the tractor. The head end of each ram 21 is pivotally connected to a depending bracket 22 by a pin 23. The depending bracket 22 is secured to the frame 10 of the tractor. The rod end of each of the hydraulic rams 21 is pivotally connected to one of the boom arms 18 intermediate the ends thereof by pin means 24. As the hydraulic rams 21 are extended, the boom arms are raised, and retraction of the rams 21 results in a lowering of the boom 15.

The bucket 16 which may be of any suitable type known in the art comprises a pair of spaced apart side walls 27 interconnected by a curved plate 28 which forms the back bottom walls of the bucket. A cutting edge 29 is secured to the forward marginal edge of the bottom wall of the bucket. The rear wall of the bucket 16 is provided with two sets of flanges 30 which are transversely spaced apart adjacent to the side walls 27. The forward end of each boom arm 18 is pivotally connected to one of the flanges 30 substantially at the lower portion thereof by pin means 31.

Figure 2:
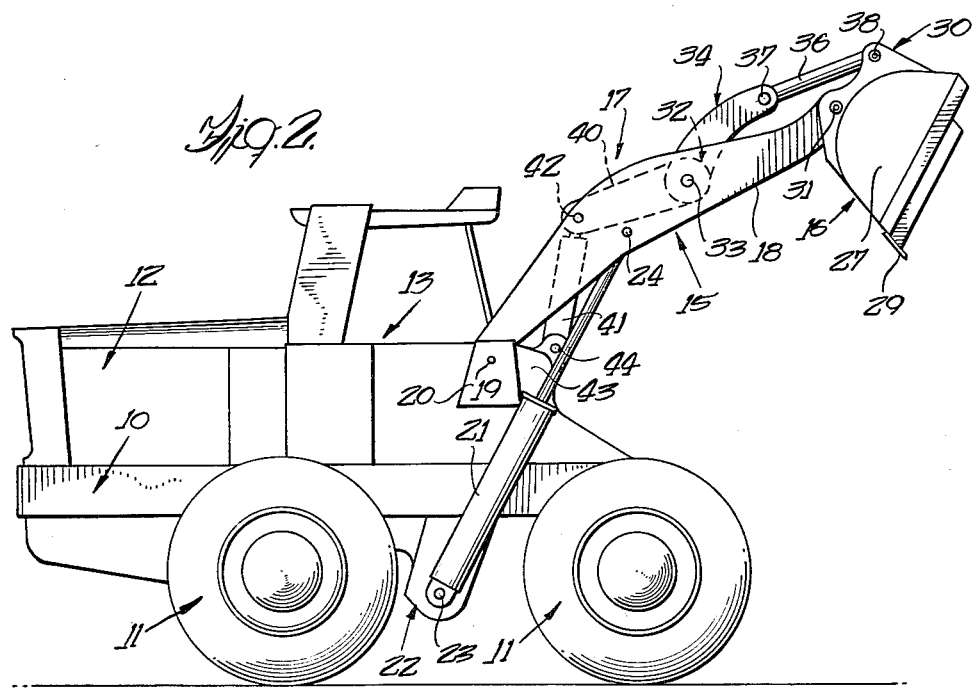
Fig. 2 is a view similar to that of Fig. 1 but with the boom fully raised and with the bucket operated to the dump position.
Figure 3:
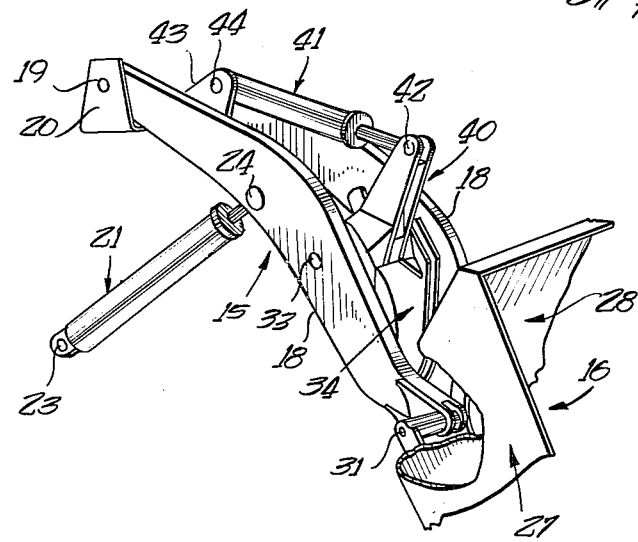
Fig. 3 is an enlarged partial isometric view of the structure shown in Fig. 1 with a portion of the bucket removed to show the boom pivotal connection to the bucket.

The lever arrangement 17 of the linkage means comprises a cylindrical member 32 which has a length substantially equal to the transverse distance between the boom arms 18 and is journalled on a shaft or rod 33 which is carried between the boom arms 18 intermediate the ends thereof. A pair of levers 34 are provided and are constructed substantially as box sections such as shown in Figs. 3 and 4. The levers 34 are wider at one end than at the other and are curved as may be seen in the drawings. The wide end of each of the levers 34 is rigidly secured to the cylindrical member 32 substantially at the ends thereof. The curvature of the levers 34 is provided for suitable clearance of the levers 34 from the forward axle housing of wheels 11 when the boom 15 is in its lowermost position and the cylindrical member 32 is pivoted clockwise. The narrow end of the levers 34 which normally depend below the boom arms 18 in all positions but the dump position shown in Fig. 2, are each pivotally connected to one end of a link 36 by pin means 37. The other end of each of the links 36 is pivotally connected to one of the flanges 30 by pin means 38. Pin means 38 are disposed in the flanges 30 substantially above the pin means 31 for the boom arms 18.

The center lever 40 of the lever arrangement 17 may also be formed of a box section such as shown in Figs. 3 and 4. The center lever 40 is rigidly secured at one end thereof on the cylindrical member 32 between the levers 34. The lever 40 extends radially from the cylindrical member 32 substantially in the opposite direction from levers 34 as can be seen in the drawings.

The upper end of the lever 40, which normally extends in an upper direction in all but the dump position shown in Fig. 2, is pivotally connected to the rod end of the bucket-pivoting hydraulic ram 41 by pin means 42. The head end of the hydraulic ram 41 is pivotally connected to a flange arrangement 43 by pin means 44. The flange arrangement 43 is carried on the forward portion of the tractor at a position such that the pins 19 and 44 are in substantial horizontal alignment with the pins 44 being disposed substantially forwardly of the pins 19. The described members connected between the tractor, the leverage arrangement, and the bucket 16 complete the linkage means for pivoting the bucket 16 relative to the boom 15. When the hydraulic ram 40 is retracted, the leverage arrangement 17 is pivoted counterclockwise as viewed in the drawing and the bucket 16 is pivoted clockwise. When the hydraulic ram 41 is extended, the bucket 16 is moved counterclockwise or rearwardly towards the tractor.

Suitable hydraulic fluid pump, reservoir, valve and conduit means (not shown) are provided for selective operation of the hydraulic rams 21 and 41 by the operator of the machine.

Figure 1:
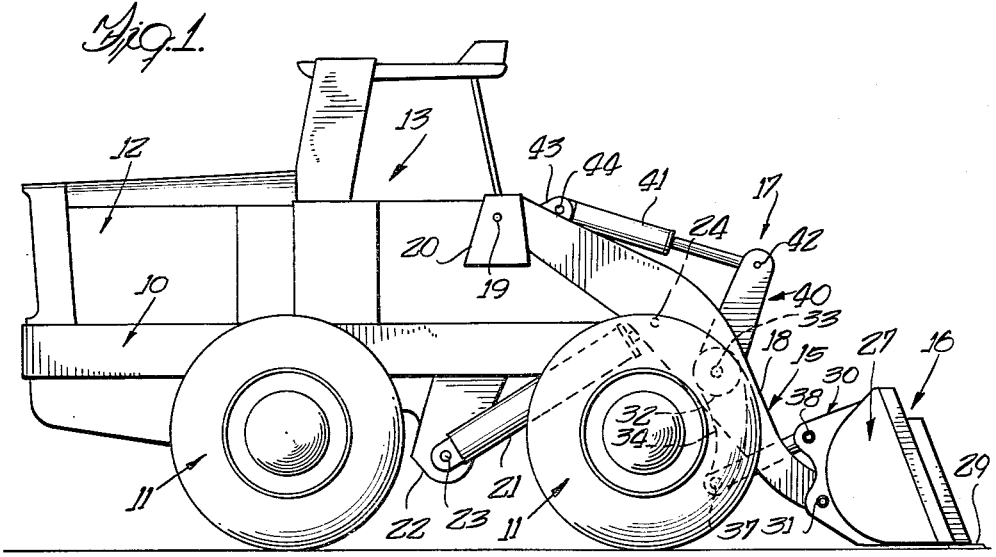
Fig. 1 is a side elevational view of a tractor loader constructed according to the present invention.

In the digging operation, the bucket is generally positioned such as shown in Fig. 1, with the bottom wall thereof in a substantially horizontal plane, and the tractor is then moved forwardly to force the cutting edge 29 into the material to be worked. As the bucket 16 engages the material being worked, a reaction force is applied from the material to the bucket tending among other things to pivot the bucket about the pin means 31 on the boom. This reaction force will not result in any relative deflection of the boom arms 18 as the lever arrangement 17 will support each side of the bucket in an identical manner and the reaction force will be applied from the leverage arrangement 17 to the center of the tractor through the hydraulic ram 41. In the construction of machines according to the present invention it has been found that the stability of the loader is excellent. Further, in pivoting the bucket relative to the boom 15, the forces resulting from the extensions and retractions of the hydraulic ram 41 are uniformly applied to both sides of the bucket through the center lever 40, the cylindrical member 32 and the two side levers 34.

The dump position shown in Fig. 2 illustrates the change in positions of the various members which occurs in moving the bucket 16 from the digging position at ground level.

From the position shown in Fig. 1, the bucket 16 may be pivoted rearwardly to a break-out position by a further extension of hydraulic ram 41. If the rams 21 are then extended, the bucket 16 will automatically be pivoted rearwardly relative to the boom 15 before obstructing the forward vision of the operator and thereafter as the boom 15 is raised will automatically be pivoted forwardly to compensate for the rearward tilt to keep the bucket 16 substantially level relative to the ground. This is accomplished by the relative locations of the pin means 19, 43, 31 and 38 and the defined boom 15 and linkage means constructions.

Having described the invention, what is considered new and desired to be protected by Letters Patent is:

1. In a tractor loader having a pair of boom arms pivotally carried on each side of the tractor and extending forwardly thereof and having a bucket pivotally connected at the rear side portions thereof to the forward end of said boom arms, a linkage arrangement comprising a hydraulic ram pivotally carried at one end thereof on said tractor substantially at the transverse center thereof, a leverage arrangement comprising a cylindrical member, a shaft journalled through said cylindrical member and connected at each end thereof to said boom arms intermediate the ends thereof, a center lever rigidly secured at one end thereof to said cylindrical member intermediate the ends thereof and extending radially outwardly therefrom in a certain direction, means pivotally connecting the outer end of said center lever to the other end of said hydraulic ram, a pair of levers, one end of each of said pair of levers secured to said cylindrical member on each side of said center member and substantially at the outer ends of said cylindrical member, said cylindrical member having a length substantially equal to the distance between said boom arms, a pair of links, each of said links pivotally connected at one end thereof to the outer end of one of said pair of levers, means pivotally connecting the other end of each of said links to said bucket substantially to the rearward side portions thereof, said pair of levers extending radially outwardly from said cylindrical member substantially in the opposite direction from said certain direction of said center lever.

2. A leverage arrangement for pivoting the bucket of a front end type tractor loader wherein the bucket is pivotally carried on the outer end of the boom, comprising a cylindrical member having a length substantially equal to the distance between the boom arms of said boom, a shaft journalled through said cylindrical member and connectable at each end thereof to said boom arms intermediate the ends thereof, a center lever rigidly secured at one end thereof to said cylindrical member intermediate the ends thereof and extending radially outwardly therefrom in a certain direction, a pair of levers, one end of each of said pair of levers secured to cylindrical member at the outer end of said cylindrical member and disposed to extend radially outwardly from said cylindrical member substantially in the opposite direction from said certain direction of said center lever, a hydraulic ram pivotally connected at one end thereof to the outer end of said center lever and connectable at the other end thereof to said tractor, and a pair of links pivotally connected at one end of each thereof to the outer ends of said pair of levers and connectable at the other ends thereof to the rear wall of said bucket.

3. In a tractor loader comprising a four wheeled vehicle and having a pair of boom arms pivotally carried on each side of a tractor and extending forwardly thereof between the forward wheels of the tractor and the sides of the body thereof and having a bucket pivotally connected at the rear side portions thereof to the forward end of said boom arms, said boom being connected to said tractor so that when the bucket is disposed at ground level the intermediate portion of the boom passes immediately over and forwardly of the front axle for said front wheels, a linkage arrangement for pivoting the bucket relative to the boom comprising a single hydraulic ram pivotally connected at one end thereof on said tractor substantially at the transverse center thereof and forwardly of the pivotal connection of said boom to said tractor, and a leverage arrangement comprising a cylindrical member, a shaft journalled through said cylindrical member and connected at each end thereof to said boom arms at said intermediate portions thereof, a center lever rigidly secured at one end thereof to said cylindrical member intermediate the ends thereof and extending upwardly therefrom, means pivotally connecting the other end of the center lever to the other end of said hydraulic ram, said center lever and said hydraulic ram being formed so that when said hydraulic ram is substantially extended and said bucket is disposed substantially at ground level, said center lever is diposed substantially vertically, a pair of levers, one end of each of said pair of levers secured to said cylindrical member on each side of said center member and substantially at the outer ends of said cylindrical member, said cylindrical member having a length substantially equal to the distance between said boom arms, said pair of levers being curved convexly toward the forward end of said tractor when viewed from the side of said tractor and said pair of levers extending substantially vertically downwardly from said cylindrical member when said center lever is disposed substantially vertically upwardly, a pair of links, each of said links pivotally connected at one end thereof to the outer end of one of said pair of levers, means pivotally connecting the other end of each of said links to said bucket substantially at the rearward side portions thereof.

4. In a tractor loader as claimed in claim 3 wherein said leverage arrangement is disposed with said center lever and said pair of levers positioned substantially vertically when said bucket is in the horizontal digging position at ground level and wherein the connections of said pair of links to said bucket are disposed vertically above the pivotal connections of said bucket on said boom whereby said bucket is automatically pivoted rearwardly relative to said boom when said boom is raised to a position before obstructing the forward vision of the operator of the tractor and wherein said bucket is pivoted forwardly upon further raising of said boom.

5. In a tractor loader as claimed in claim 3 wherein the pivotal axes of said boom arms and said hydraulic ram on said tractor are disposed forwardly of said operator's compartment and below the horizontal line of sight of any operator of said tractor loader.

References Cited in the file of this patent

UNITED STATES PATENTS 2,672,994     Werner _____ Mar. 23, 1954